US010027979B2

(12) United States Patent
Eymery et al.

(10) Patent No.: US 10,027,979 B2
(45) Date of Patent: Jul. 17, 2018

(54) VARIABLE RATE VIDEO ENCODER

(71) Applicant: Allegro DVT, Meylan (FR)

(72) Inventors: Pascal Eymery, Saint Martin d'Heres (FR); Christophe Chong-Pan, Grenoble (FR)

(73) Assignee: Allegro DVT, Meylan (FR)

( * ) Notice: Subject to any disclaimer, the term of this patent is extended or adjusted under 35 U.S.C. 154(b) by 281 days.

(21) Appl. No.: 14/805,152

(22) Filed: Jul. 21, 2015

(65) Prior Publication Data

US 2016/0029042 A1 Jan. 28, 2016

(30) Foreign Application Priority Data

Jul. 25, 2014 (FR) ..................... 14 57229

(51) Int. Cl.
| | |
|---|---|
| *H04N 19/593* | (2014.01) |
| *H04N 19/107* | (2014.01) |
| *H04N 19/577* | (2014.01) |
| *H04N 19/126* | (2014.01) |
| *H04N 19/172* | (2014.01) |
| *H04N 19/124* | (2014.01) |
| *H04N 19/146* | (2014.01) |

(52) U.S. Cl.
CPC ......... *H04N 19/593* (2014.11); *H04N 19/107* (2014.11); *H04N 19/124* (2014.11); *H04N 19/126* (2014.11); *H04N 19/146* (2014.11); *H04N 19/172* (2014.11); *H04N 19/577* (2014.11)

(58) Field of Classification Search
None
See application file for complete search history.

(56) References Cited

U.S. PATENT DOCUMENTS

| | | | | |
|---|---|---|---|---|
| 5,231,484 A | * | 7/1993 | Gonzales | ............... H04N 19/00 348/469 |
| 5,949,490 A | | 9/1999 | Borgwardt et al. | |
| 9,667,981 B2 | * | 5/2017 | Xu | .......................... H04N 19/40 |
| 9,706,203 B2 | * | 7/2017 | Eymery | ............... H04N 19/115 |

(Continued)

FOREIGN PATENT DOCUMENTS

WO WO 2009157827 A1 12/2009

OTHER PUBLICATIONS

French Search Report dated Apr. 30, 2015 from corresponding French Application No. 14/57229.
French Search Report dated May 13, 2015 from potentially related French Application No. 14/57231.
Myoung-Jin Kim et al: *Adaptive Rate Control Based on Statistical Modeling in Frame-layer for H.264/AVC*, Advanced Communication Technology (ICACT), 2011 13th International Conference on, IEEE, Feb. 13, 2011, pp. 680-683, XP032013153.

(Continued)

*Primary Examiner* — Mohammad J Rahman
(74) *Attorney, Agent, or Firm* — Wolf, Greenfield & Sacks, P.C.

(57) ABSTRACT

The invention concerns a method of video encoding comprising: determining a first ratio ($IP_{RATIO}$) based on previously encoded picture frames of a video sequence comprising one or more intra-coded pictures (I) and one or more predicted pictures (P), the first ratio ($IP_{RATIO}$) being calculated based on the ratio between the size of one or more previously encoded intra-coded pictures and the size of one or more previously encoded predicted pictures; and determining a quantization parameter (QP) to be applied to a frame to be encoded based on the first ratio ($IP_{RATIO}$).

11 Claims, 1 Drawing Sheet

(56) References Cited

U.S. PATENT DOCUMENTS

| | | | |
|---|---|---|---|
| 2006/0233237 | A1 | 10/2006 | Lu et al. |
| 2007/0274384 | A1* | 11/2007 | Schwarz .............. H04N 19/176 375/240.12 |
| 2011/0075730 | A1* | 3/2011 | Samuelsson ......... H04N 19/139 375/240.03 |
| 2012/0002724 | A1* | 1/2012 | Klim .................... H04N 19/176 375/240.03 |
| 2012/0269258 | A1* | 10/2012 | Yang ................ H04N 19/00163 375/240.02 |
| 2013/0272383 | A1* | 10/2013 | Xu ....................... H04N 19/172 375/240.03 |
| 2014/0241421 | A1* | 8/2014 | Orton-Jay ............ H04N 19/105 375/240.03 |
| 2014/0321535 | A1* | 10/2014 | Kim .................... H04N 19/124 375/240.03 |
| 2014/0328384 | A1* | 11/2014 | Novotny .......... H04N 21/23655 375/240.02 |
| 2016/0029020 | A1* | 1/2016 | Eymery ............... H04N 19/115 382/251 |

OTHER PUBLICATIONS

Miryem Hrarti et al: *A New approach of Rate-Quantization Modeling for Intra and Inter Frames in H.264 Rate Control*, Signal and Image Processing Applications (ICSIPA), 2009 IEEE International Conference on, IEEE, Piscataway, NJ, Nov. 18, 2009, pp. 474-479, XP031685407.

Yongqiang Bai et al: *Improved Bit-allocation and Rate-control Algorithm Based on TM5*, Signal Processing, 2008. ICSP 2008. 9th International Conference on, IEEE, Piscataway, NJ, USA, Oct. 26, 2008, pp. 1916-1919, XP031369438.

W-N Lie et al: *Two-pass Rate-Distortion Optimized Rate Control Technique for H.264/AVC Video*, Visual Communications and Image Processing; Jul. 12, 2005-Jul. 15, 2005; Beijing, Jul. 12, 2005, XP030080948.

Parisa Sha'Afi Kabiri et al: *An Adaptive Fast Bitrate Shaping Scheme for H.264/AVC Rate Control*, Broadband Multimedia Systems and Broadcasting (BMSB), 2012 IEEE International Symposium on, IEEE, Jun. 27, 2012, pp. 1-5, XP032222341.

\* cited by examiner

VARIABLE RATE VIDEO ENCODER

CROSS REFERENCE TO RELATED APPLICATIONS

Foreign priority benefits are claimed under 35 U.S.C. § 119(a)-(d) or 35 U.S.C. § 365(b) of French application number 14/57229, filed Jul. 25, 2014, entitled "VARIABLE RATE VIDEO ENCODER", which is incorporated herein by reference to the maximum extent allowable by law.

FIELD

The present disclosure relates to the field of video encoding, and in particular to a constant or variable rate video encoder and method of video encoding.

BACKGROUND

In certain applications it is desirable to encode a video sequence such that the compressed video does not exceed a given bitrate. For example, it may be that the compressed video is to be transmitted over a transmission interface having a limited transmission bitrate, or having an output buffer on the transmission side and/or an input buffer on the receive side of limited size.

The bitrate of the compressed video can be adjusted by controlling the compression rate applied by the encoding algorithm. However, existing solutions for controlling the compression rate tend to be complex, slow and/or not capable of achieving a desired bitrate while also maintaining a high video quality.

There is thus a need in the art for a video encoder and method of video encoding that permits the compression rate to be controlled in a simple and efficient manner, while maintaining a high video quality.

SUMMARY

It is an aim of embodiments of the present disclosure to at least partially address one or more needs in the prior art.

According to one aspect, there is provided a method of video encoding comprising: determining a first ratio based on previously encoded picture frames of a video sequence comprising one or more intra-coded pictures and one or more predicted pictures, the first ratio being calculated based on the ratio between the size of one or more previously encoded intra-coded pictures and the size of one or more previously encoded predicted pictures; and determining a quantization parameter to be applied to a frame to be encoded based on the first ratio.

According to one embodiment, the first ratio is determined based on a previous value of the first ratio and on a latest ratio between the encoded size of the latest of the intra-coded pictures to be encoded and the latest of the predicted pictures to be encoded.

According to one embodiment, the first ratio is determined based on the following equation:

$$IP_{RATIO} = \frac{\frac{PREVIOUS\_IP_{RATIO}}{W} + LATEST\_IP_{RATIO}}{COUNT\_IP_{RATIOS}}$$

where $PREVIOUS\_IP_{RATIO}$ is the previous value of the first ratio, W is a weight applied to the previous value of the first ratio, $LATEST\_IP_{RATIO}$ is said latest ratio and $COUNT\_IP_{RATIOS}$ is a value determined based on the following equation:

$$COUNT\_IP_{RATIOS} = \frac{PREVIOUS\_COUNT\_IP_{RATIOS}}{W} + 1$$

where $PREVIOUS\_COUNT\_IP_{RATIOS}$ is the previous value of $COUNT\_IP_{RATIOS}$.

According to one embodiment, determining the quantization parameter comprises: determining the size of a sliding window of N previously encoded picture frames of the video sequence, the sliding window comprising one or more of the intra-coded pictures and one or more of the predicted pictures, where N is an integer equal to three or more; determining a target size of the sliding window based on at least the first ratio; and determining the quantization parameter to be applied to a frame to be encoded based on the comparison of the size of the sliding window with the target size of the sliding window.

According to one embodiment, the sliding window further comprises one or more bi-predicted pictures; and determining the target size of the sliding window is further based on a second ratio representing the ratio between the size of one or more of said predicted pictures and the size of one or more of said bi-predicted pictures.

According to one embodiment, the target size of the sliding window is determined based on a target size of a group of successive pictures comprising the number of pictures from one intra-coded picture up to but not including a subsequent intra-coded picture.

According to one embodiment, the target size of the sliding window is determined based on the following equation:

$$SW_{TARGET\_SIZE} = (N_{I\_SW} \times IP_{RATIO} + N_{P\_SW}) \times \frac{GOP_{TARGET\_SIZE}}{IP_{RATIO} + N_{P\_GOP}}$$

where $N_{I\_SW}$ is the number of intra-coded pictures in the sliding window, $N_{P\_SW}$ is the number of predicted pictures in the sliding window, $GOP_{TARGET\_SIZE}$ is the target size of the group of successive pictures, $IP_{RATIO}$ is the first ratio and $N_{P\_GOP}$ is the number of predicted pictures in the group of successive pictures.

According to one embodiment, the target size of the group of successive pictures is determined based on the following equation:

$$GOP_{TARGET\_SIZE} = \frac{BITRATE_{TARGET} \times GOP\_LENGTH}{FRAME\_RATE}$$

where $BITRATE_{TARGET}$ is a target bitrate of the encoded video stream, GOP_LENGTH is the number of pictures in the group of pictures, and FRAME_RATE is the frame rate of the video sequence.

According to one embodiment, determining a quantization parameter to be applied to a frame to be encoded comprises determining a correction factor to be applied to a previous quantization parameter by dividing the size of the sliding window by the target size of the sliding window.

According to one embodiment, the quantization parameter has a logarithmic relation with the bitrate, and the quantization parameter is determined by applying the correction factor to a linearized value determined by linearizing the previous quantization parameter.

According to one embodiment, the quantization parameter is determined based on the following equation:

$$NEWQP = f_{QP}(f_{QS}(OLDQP) \times CORRECTION\_FACTOR)$$

where OLDQP is the previous quantization parameter, CORRECTION_FACTOR is the correction factor, $f_{QS}$ is a linearization function for linearizing the previous quantization parameter and $f_{QP}$ is the inverse of the linearization function.

According to a further aspect, there is provided a video encoder comprising a rate control circuit adapted to: determine a first ratio based on previously encoded picture frames of a video sequence comprising one or more intra-coded pictures and one or more predicted pictures, the first ratio being calculated as the ratio between the size of one or more previously encoded intra-coded pictures and the size of one or more previously encoded predicted pictures; and determine a quantization parameter to be applied to a frame to be encoded based on the first ratio.

According to one embodiment, the rate control circuit is further adapted to: determine the size of a sliding window of N previously encoded picture frames of a video sequence, the sliding window comprising one or more of the intra-coded pictures and one or more of the predicted pictures, where N is an integer equal to three or more; determine a target size of the sliding window based on at least the first ratio; and determine the quantization parameter to be applied to a frame to be encoded based on the comparison of the size of the sliding window with the target size of the sliding window.

According to one embodiment, the sliding window further comprises one or more bi-predicted pictures; and determining the target size of the sliding window is further based on a second ratio representing the ratio between the size of one or more of said predicted pictures and the size of one or more of said bi-predicted pictures.

According to one embodiment, the rate control circuit is adapted to determine the first ratio based on a previous value of the first ratio and on a latest ratio between the encoded size of the latest of the intra-coded pictures to be encoded and the latest of the predicted pictures to be encoded.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

While in the following description the particular encoding standard used to compress the video data has not been described in detail, it will be apparent to those skilled in the art that the embodiments described herein could be applied to a wide range of video compression standards, such as the H.264 ISO standard MPEG4 AVC, the MPEG-2 video standard, the VP9 standard, and the MPEG HEVC (High Efficiency Video Coding) standard.

Figure 1:
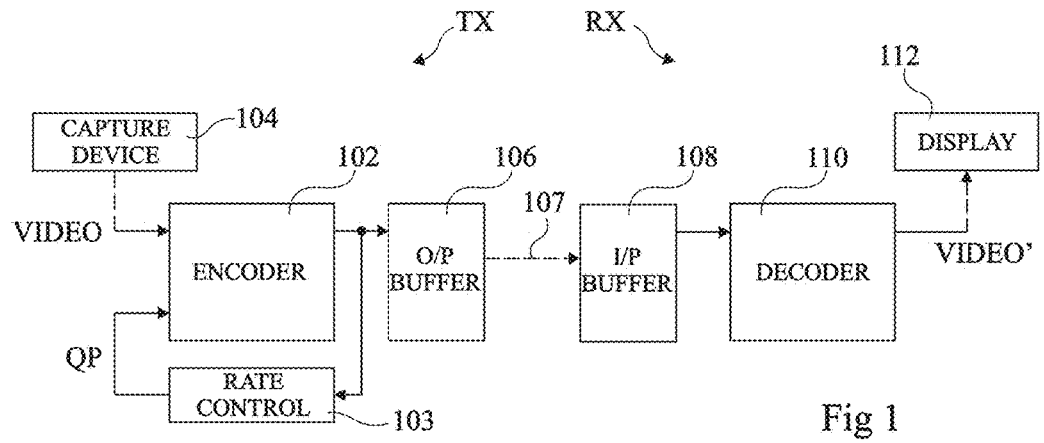
FIG. 1 schematically illustrates a video transmission system according to an example embodiment.

FIG. 1 schematically illustrates a video transmission system according to an example embodiment.

On a transmission side TX, the system comprises an encoder (ENCODER) 102, which receives uncompressed frames of a video signal (VIDEO), and encodes the frames based on a quantization parameter QP. As known to those skilled in the art, the quantization parameter determines the compression rate used by the encoder for encoding at least some of the video data, and thus influences the number of bits of encoded data for a given number of bits of input data. The lower the QP, the greater will be the number of bits of each compressed frame, and thus the video signal that will be retrieved after decoding will generally be of a higher quality. Conversely, increasing the QP will cause the number of bits to be reduced, and will often lead to a reduction in video quality.

For example, according to the H.264 ISO standard, the quantization parameter is a value of between 0 and 51, which determines the quantizer step size. The relation between the QP and the compression rate is logarithmic. In many cases, a general rule can be assumed according to which, when the QP reduces by 6 units, the number of bits of encoded data doubles.

Other encoding standards may use other types of quantization parameters to determine, to at least some extent, the compression rate that is applied while encoding the video signal.

Referring again to FIG. 1, the quantization parameter provided to the encoder 102 is for example generated by a rate control block (RATE CONTROL) 103, based on previously encoded frames. The rate control block 103 is for example implemented by a hardware circuit such as an ASIC (application specific integrated circuit) or FPGA (field-programmable integrated circuit). Alternatively, the functions of the rate control block 103 could be implemented at least partially in software, in other words by a processing device under the control of instructions stored in an instruction memory.

The video signal to be encoded by the encoder 102 is for example received from a capture device (CAPTURE DEVICE) 104, for example a camera, on the transmission side. Alternatively, the video data could be stored in a memory (not shown in FIG. 1) on the transmission side and retrieved from the memory by the encoder 102.

The encoder 102 for example provides a compressed output video stream to an output buffer (O/P BUFFER) 106 on the transmission side, which stores the data packets of compressed video until they can be transmitted over a transmission interface 107. The transmission interface 107 is for example a wired interface, such as a serial interface. Alternatively, in some embodiments, the transmission interface 107 could be a wireless interface. The length of the transmission interface 107, in other words the distance separating the transmission and receive sides of the system, could be anything from a few tens of centimeters, for example 50 cm, to tens of meters or more, depending on the application. In some cases, the transmission interface could include one or more intermediate networks, including the internet. Furthermore, the video data stored in the output buffer could be in the form of a file, which could be saved to a memory card before being transmitted.

Transmission of the compressed video data is for example performed at a constant bitrate, determined by the capabilities of the transmission line.

On the receive side RX, the compressed video data is for example received by an input buffer (I/P BUFFER) 108. The compressed video data is then read from the input buffer 108 by a decoder (DECODER) 110, which decodes the video stream to provide an uncompressed video signal VIDEO', which will generally be a slightly degraded version of the original signal VIDEO. In some embodiments, the decoded video is displayed on a display (DISPLAY) 112 on the receive side.

While FIG. 1 illustrates an example of a system comprising a transmission interface 107 between the transmission side TX and receive side RX, in alternative embodiments only the encoder 102 and rate control block 103 could be provided, and the encoded video stream may be stored in a memory and or written to a digital storage medium such as a DVD (digital versatile disc).

Figure 2:
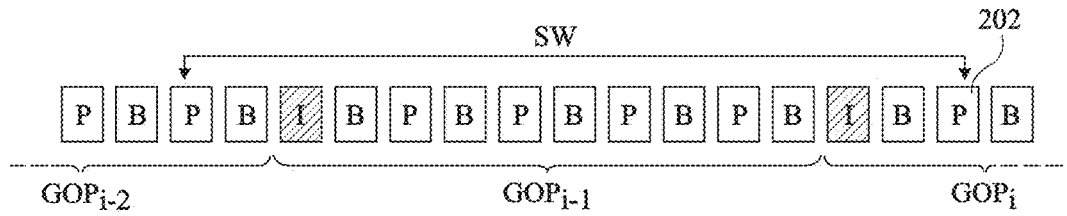
FIG. 2 is a diagram representing video frames forming groups of pictures according to an example embodiment of the present disclosure.

FIG. 2 is a diagram showing an example of a sequence of frames, each represented by a box with a letter I, P or B respectively corresponding to an intra-coded picture (I), a predicted picture (P) and a bi-predicted picture (B). As is known in the art, an intra-coded picture is encoded based only on data from within the frame itself, whereas a predicted picture is generally encoded using at most one motion vector to predict each image block, and a bi-predicted picture is generally encoded using at most two motion vectors to predict each image block. In some embodiments, the sequence of frames may comprise only intra-coded and predicted pictures.

A group of pictures (GOP) is for example defined as a two or more successive pictures of the video sequence, including at least one intra-coded picture. In the example of FIG. 2, each group of pictures comprises an intra-coded (I) picture followed by a further 9 predicted (P) and bi-predicted (B) pictures, after which another intra-coded (I) picture is present. FIG. 2 shows four pictures of a group of pictures $GOP_i$ on the right in the figure, a previous group $GOP_{i-1}$ of ten pictures in the center of the figure, and four pictures of an even earlier group of pictures $GOP_{i-2}$ in the left of the figure.

A sliding window SW is also defined as a block of the N latest pictures to have been encoded. In the example of FIG. 2, N is equal to 15. It is assumed that the third picture of the group $GOP_i$ is the latest picture to have been encoded, and the sliding window SW is therefore shown comprising this picture and a further 14 previously encoded pictures. More generally, the sliding window for example comprises at least three pictures, and in some embodiments, the sliding window corresponds to a duration of around 1 second of video, for example between 0.5 and 2 seconds. As will become apparent here after, the size of the sliding window is a trade-off, as the larger it is, the lower the difference in quality between two consecutive images, but the less reactive the rate control will be following scene changes.

A method of controlling the bitrate during video encoding based on the groups of pictures and the sliding window of FIG. 2 will now be described in more detail with reference to a flow diagram of FIG. 3.

Figure 3:
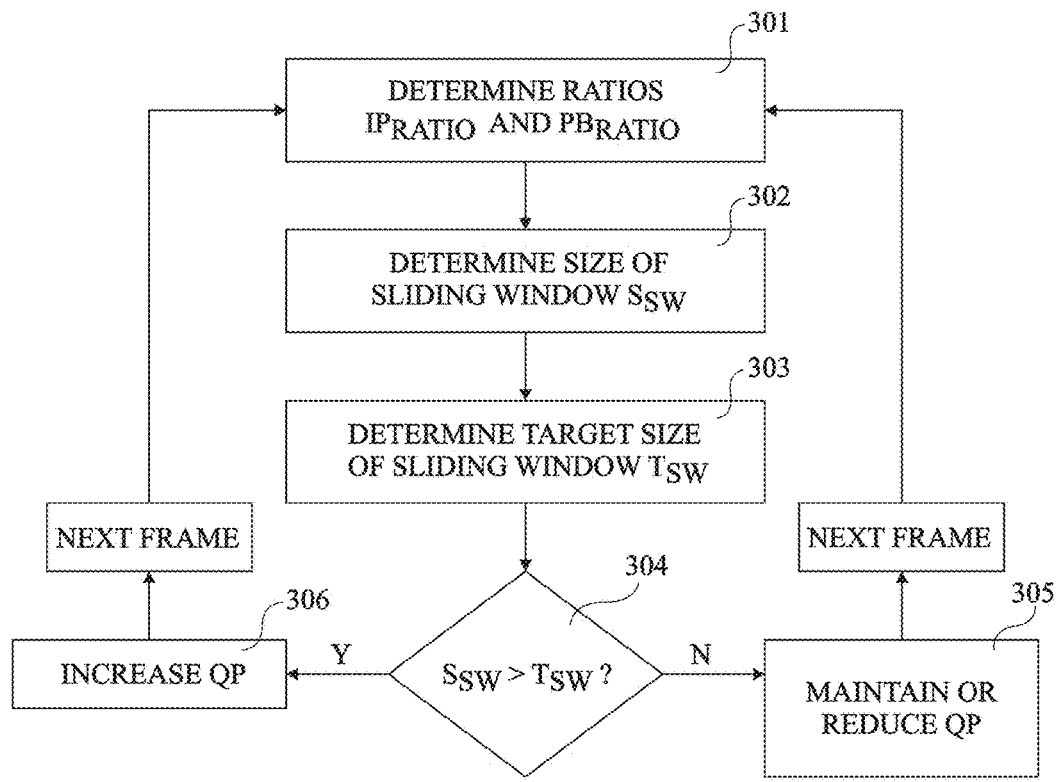
FIG. 3 is a flow diagram illustrating steps in a method of video encoding according to an example embodiment of the present disclosure.

The method of FIG. 3 is for example applied each time a new picture has been encoded. Alternatively, it could be applied after every few pictures have been encoded, for example after each group of pictures $GOP_i$ has been encoded.

In an operation 301, encoded picture size ratios are determined. For example, in the case that the video sequence comprises intra-coded, predicted and bi-predicted pictures, a ratio $IP_{RATIO}$ is for example determined that represents the size ratio between intra-coded and predicted pictures in the encoded sequence, and a ratio $PB_{RATIO}$ is for example determined that represents the ratio between predicted pictures and a bi-predicted pictures in the encoded sequence. In the case that there are only intra-coded and predicted pictures in the sequence, only the ratio $IP_{RATIO}$ is provided.

The ratios are variables that are periodically recalculated based on one or more previously encoded pictures of each type. For example, the ratios can be determined as follows based on the sizes of the latest picture of each type to have been encoded:

$$IP_{ratio} = \text{last\_I\_picture\_size}/\text{last\_P\_picture\_size, and}$$

$$PB_{ratio} = \text{last\_P\_picture\_size}/\text{last\_B\_picture\_size}$$

where last_I_picture_size is the normalized size of the last encoded intra-coded picture, last_P_picture_size is the normalized size of the last encoded predicted picture, and last_B_picture_size is the normalized size of the last encoded bi-predicted picture. The sizes of the last encoded intra-coded picture, predicted picture and/or bi-predicted picture are for example normalized if they were encoded based on different QP values from each other. For example, the normalization could be performed based on the assumption that when the QP reduces by 6 units, the number of bits of encoded data doubles.

Alternatively, the ratios may be calculated based on more than one previous picture of each size. For example, the ratios are calculated as the average of one or more previous ratios, as will now be described for the case of the ratio $IP_{RATIO}$. The ratio $PB_{RATIO}$ may be calculated in the same fashion.

The ratio $IP_{RATIO}$ is for example calculated based on the following formula:

$$IP_{RATIO} = \frac{\frac{\text{PREVIOUS\_IP}_{RATIO}}{W} + \text{LATEST\_IP}_{RATIO}}{\text{COUNT\_IP}_{RATIOS}}$$

where PREVIOUS_IP$_{RATIO}$ is a previous value of the ratio IP$_{RATIO}$, W is a weight applied to the previous ratio, LATEST_IP$_{RATIO}$ is the ratio between the size of the latest encoded intra-coded picture and the latest encoded predicted picture, and COUNT_IP$_{RATIOS}$ is a value representing the number of ratios already calculated, which is for example determined based on the following formula:

$$\text{COUNT\_IP}_{RATIOS} = \frac{\text{PREVIOUS\_COUNT\_IP}_{RATIOS}}{W} + 1$$

where PREVIOUS_COUNT_IP$_{RATIOS}$ is the previous value of COUNT_IP$_{RATIOS}$ and is for example initialized at zero. Thus, for each newly encoded I or P picture, a new latest ratio LATEST_IP$_{RATIO}$ is calculated, the current IP$_{RATIO}$ becomes the previous ratio PREVIOUS_IP$_{RATIO}$, and the above formulas are used to determine the new IP ratio.

In one embodiment, the weight W is equal to 2 or more, thereby giving a greater weighting to the latest IP ratio as compared to previous IP ratios.

Referring again to FIG. 3, in a subsequent operation 302, the current size $S_{sw}$ of the sliding window is for example determined. In particular, this for example involves summing the sizes of the N latest pictures. Alternatively, other techniques could be used to determine or estimate the sliding window size, such as removing the oldest picture from the sliding window, and adding the last encoded pictures, such that the new size New_Ssw of the sliding window is equal to Old_Ssw−Sp[c−n]+Sp[c], where Old_Ssw is the previous size of the sliding window, Sp[c−n] is the size of the picture n pictures before the current picture, and Sp[c] is the last encoded picture.

In a subsequent operation 303, a target size $T_{sw}$ of the sliding window is determined, based on the ratios determined in operation 301. For example, this comprises determining a target size of each group of pictures GOP. For example, in the case that there are only intra-coded and predicted pictures, the target size $T_{sw}$ of the sliding window is determined based on the following equation:

$$T_{SW} = (N_{I\_SW} \times IP_{RATIO} + N_{P\_SW}) \times \frac{GOP_{TARGET\_SIZE}}{IP_{RATIO} + N_{P\_GOP}}$$

where $N_{I\_SW}$ is the number of intra-coded pictures in the sliding window, $N_{P\_SW}$ is the number of predicted pictures in the sliding window, $GOP_{TARGET\_SIZE}$ is the target size of the group of pictures and $N_{P\_GOP}$ is the number of predicted pictures in each group of pictures.

Alternatively, in the case that there are intra-coded, predicted and bi-predicted pictures, the target size of the sliding window is determined based on the following equation:

$$T_{SW} = (N_{I\_SW} \times IP_{RATIO} + N_{P\_SW} + N_{B\_SW} \times BP_{RATIO}) \times \frac{GOP_{TARGET\_SIZE}}{IP_{RATIO} + N_{P\_GOP} + N_{B\_GOP} \times PB_{RATIO}}$$

where $N_{B\_SW}$ is the number of bi-predicted pictures in the sliding window, and $N_{B\_GOP}$ is the number of bi-predicted pictures in each group of pictures.

The target size of the group of pictures GOP is for example determined based on the following equation:

$$GOP_{TARGET\_SIZE} = \frac{BITRATE_{TARGET} \times GOP\_LENGTH}{FRAME\_RATE}$$

where $BITRATE_{TARGET}$ is a target bitrate of the encoded video stream, GOP_LENGTH is the number of pictures in the group of pictures, and FRAME_RATE is the frame rate of video sequence.

In a subsequent operation 304, the size $S_{sw}$ of the sliding window is for example compared to the target size $T_{sw}$ of the sliding window to determine whether or not the actual size $S_{SW}$ exceeds the target size $T_{SW}$. Based on the comparison, the quantization parameter is adjusted.

For example, if it is found in operation 304 that the size of the sliding window is not greater than the target size, in a next operation 305, the current quantization parameter QP is maintained, or reduced. For example, if the size of the sliding window is within a given percentage of the target size, for example within 5 percent, the current QP is maintained. If however the size of the sliding window is less than 5 percent lower than the target size, the QP is reduced, in order to increase the bitrate of the video sequence and thus increase the video quality. The method then returns to operation 301, where a next frame is processed.

Alternatively, if in operation 304 it is found that the size of the sliding window $S_{sw}$ is greater than the target size $T_{sw}$, in a next operation 306, the quantization parameter is for example increased. The method then returns to operation 301, in which a next frame is processed.

In some embodiments, the quantization parameter is adjusted based on a correction factor. For example, the correction factor is determined based on the following equation:

CORRECTION_FACTOR=$S_{SW}/T_{SW}$

The correction factor is for example applied in a linear fashion to the quantization parameter. Indeed, the quantization parameter generally has a logarithmic relation with the bitrate of the output video stream. For example, in some cases, when the QP increases by 6 units, the number of bits of encoded data doubles. The correction factor is therefore for example applied to a linearized value of the quantization parameter, and the linearized value is then reconverted into a logarithmic value. For example, a new quantization parameter (NEWQP) is determined based on the following equation:

NEWQP=$f_{QP}(f_{QP}$(OLDQP)×CORRECTION_FACTOR)

where OLDQP is the previous quantization parameter, CORRECTION_FACTOR is the correction factor, for example equal to the size of the sliding window $S_{SW}$ divided by the target size of the sliding window $T_{SW}$, $f_{QS}$ is a linearization function for linearizing the previous quantization parameter and $f_{QP}$ is the inverse of the linearization function. The linearization function is for example based on the following equation:

$f_{QS}$(QP)=0.85*$2^{(QP-12)/6}$

The inverse of the linearization function is for example based on the following equation:

$f_{QP}$(QS)=12+6*log$_2$(QS/0.85)

In alternative embodiments, the correction factor is used to modify the QP by calculating a difference value DIFF based on the following equation:

DIFF=($S_{SW}'$−FOCUS_SIZE)*100/FOCUS_SIZE where $S_{SW}'$ is the previous sliding window size, and FOCUS_SIZE is a value between the previous sliding window size and the target sliding window size $T_{SW}$. For example, FOCUS_SIZE is determined by the following equation:

FOCUS_SIZE = TARGET_SIZE + $\frac{(TARGET\_SIZE \times CURRENT\_ERROR \times FRAME\_RATE)}{(SPEED\_COEFF \times TARGET\_BITRATE)}$ where CURRENT_ERROR is an error value equal to $S_{SW}$−PREDICTED_$S_{SW}$, where $S_{SW}$ is the current sliding window size and PREDICTED_$S_{SW}$ is a predicted sliding window size, and SPEED_COEFF is a coefficient determined as a function of the error value, for example based on the following table applied from top down:

| CURRENT_ERROR | SPEED_COEFF |
| --- | --- |
| >=0.20 × BITRATE$_{TARGET}$ | 2 |
| >=0.15 × BITRATE$_{TARGET}$ | 3 |
| >=0.10 × BITRATE$_{TARGET}$ | 4 |

-continued

| CURRENT_ERROR | SPEED_COEFF |
|---|---|
| >−0.10 × BITRATE$_{TARGET}$ | None |
| >−0.15 × BITRATE$_{TARGET}$ | 4 |
| >−0.20 × BITRATE$_{TARGET}$ | 3 |
| Otherwise | 2 |

Of course, the table above provides only one example, and it will be apparent to those skilled in the art that various choices of threshold errors and the corresponding speed coefficients would be possible.

The value FOCUS_SIZE thus determines the speed at which the sliding window size converges to the target size, and is for example calculated so as not to converge quickly towards the target size while the error is low, thereby avoiding sharp differences in quality between one image and the next.

The quantization parameter is then for example adjusted based on the computed difference DIFF. For example, the quantization parameter is changed by an amount ΔQP determined using the rules defined in the following table, applied from the top down:

| DIFF | ΔQP |
|---|---|
| >100% | +4 |
| >50% | +3 |
| >30% | +2 |
| >15% | +1 |
| >=−24% | 0 |
| >=−34% | −1 |
| >=−50% | −2 |
| Otherwise | −3 |

Of course, the table above provides only one example, and it will be apparent to those skilled in the art that various choices of thresholds and corresponding changes to the quantization parameter would be possible.

In alternative embodiments, other algorithms could be used for determining the updated quantization parameter.

An advantage of the embodiments described herein is that the bitrate of the encoded video can be controlled in a simple and efficient manner to be close to a target rate, while maintaining high video quality. In particular, by basing the calculation on a sliding window of three or more pictures, changes to the quantization parameter will be relatively smooth.

Having thus described at least one illustrative embodiment, various alternatives, modifications and improvements will readily occur to those skilled in the art.

For example, it will be apparent to those skilled in the art that the changes applied to the QP based on the comparison of the sliding window size and the target size will depend on the particular application.

Furthermore, it will be apparent to those skilled in the art that, rather than being based on a sliding window of pictures, the new QP value could be determined using other techniques.

Furthermore, it will be apparent to those skilled in the art that the various features described in relation to the various embodiments could be combined, in alternative embodiments, in any combination.

The invention claimed is:

1. A method of video encoding comprising:
    determining, using a rate control circuit, a first ratio (IPRATIO) based on previously encoded picture frames of a video sequence comprising one or more intra-coded pictures (I) and one or more predicted pictures (P), the first ratio (IPRATIO) being calculated based on the ratio between the size of one or more previously encoded intra-coded pictures and the size of one or more previously encoded predicted pictures;
    determining, using the rate control circuit, the size (SSW) of a sliding window of N previously encoded picture frames of the video sequence, the sliding window comprising one or more of the intra-coded pictures and one or more of the predicted pictures, where N is an integer equal to three or more;
    determining, using the rate control circuit, a target size (TSW) of the sliding window based on a target size of a group (GOP) of successive pictures comprising a number of pictures from one intra-coded picture up to but not including a subsequent intra-coded picture, the target size being determined based on the following equation:

$$T_{SW} = (N_{I\_SW} \times IP_{RATIO} + N_{P\_SW}) \times \frac{GOP_{TARGET\_SIZE}}{IP_{RATIO} + N_{P\_GOP}}$$

where $N_{I\_SW}$ is the number of intra-coded pictures in the sliding window, $N_{P\_SW}$ is the number of predicted pictures in the sliding window, $GOP_{TARGET\_SIZE}$ is the target size of the group of successive pictures, $IP_{RATIO}$ is the first ratio and $N_{P\_GOP}$ is the number of predicted pictures in the group of successive pictures;
    determining, using the rate control circuit, a quantization parameter (QP) to be applied to a frame to be encoded based on the first ratio (IPRATIO) and a comparison of the size of the sliding window with the target size of the sliding window; and
    encoding, using an encoder, the frame to be encoded using the determined quantization parameter.

2. The method of claim 1, wherein the first ratio (IP$_{RATIO}$) is determined based on a previous value of the first ratio (PREVIOUS_IP$_{RATIO}$) and on a latest ratio between the encoded size of the latest of the intra-coded pictures to be encoded and the latest of the predicted pictures to be encoded.

3. The method of claim 2, wherein the first ratio is determined based on the following equation:

$$IP_{RATIO} = \frac{\frac{PREVIOUS\_IP_{RATIO}}{W} + LATEST\_IP_{RATIO}}{COUNT\_IP_{RATIOS}}$$

where PREVIOUS_IP$_{RATIO}$ is the previous value of the first ratio, W is a weight applied to the previous value of the first ratio, LATEST_IP$_{RATIO}$ is said latest ratio and COUNT_IP$_{RATIOS}$ is a value representing the number of ratios determined based on the following equation:

$$COUNT\_IP_{RATIOS} = \frac{PREVIOUS\_COUNT\_IP_{RATIOS}}{W} + 1$$

where PREVIOUS_COUNT_IP$_{RATIOS}$ is the previous value of COUNT_IP$_{RATIOS}$.

4. The method of claim 1, wherein:
the sliding window further comprises one or more bi-predicted pictures (B); and
determining the target size ($T_{SW}$) of the sliding window is further based on a second ratio ($PB_{RATIO}$) representing the ratio between the size of one or more of said predicted pictures and the size of one or more of said bi-predicted pictures.

5. The method of claim 1, wherein the target size of the group of successive pictures is determined based on the following equation:

$$GOP_{TARGET\_SIZE} = \frac{BITRATE_{TARGET} \times GOP\_LENGTH}{FRAME\_RATE}$$

where $BITRATE_{TARGET}$ is a target bitrate of the encoded video stream, GOP_LENGTH is the number of pictures in the group of pictures, and FRAME_RATE is the frame rate of the video sequence.

6. The method of claim 1, wherein determining a quantization parameter (QP) to be applied to a frame to be encoded comprises determining a correction factor to be applied to a previous quantization parameter by dividing the size of the sliding window by the target size of the sliding window.

7. The method of claim 6, wherein the quantization parameter has a logarithmic relation with the bitrate, and the quantization parameter is determined by applying the correction factor to a linearized value (QS) determined by linearizing the previous quantization parameter.

8. The method of claim 6, wherein the quantization parameter (NEWQP) is determined based on the following equation:

$$NEWQP = f_{QP}(f_{QS}(OLDQP) \times CORRECTION\_FACTOR)$$

where OLDQP is the previous quantization parameter, CORRECTION_FACTOR is the correction factor, $f_{QS}$ is a linearization function for linearizing the previous quantization parameter and $f_{QP}$ is the inverse of the linearization function.

9. A video system comprising:
a rate control circuit configured to:
determine the size ($S_{SW}$) of a sliding window of N previously encoded picture frames of the video sequence, the sliding window comprising one or more of the intra-coded pictures and one or more of the predicted pictures, where N is an integer equal to three or more;
determine a target size ($T_{SW}$) of the sliding window based on a target size of a group (GOP) of successive pictures comprising a number of pictures from one intra-coded picture up to but not including a subsequent intra-coded picture, the target size being determined based on the following equation:

$$T_{SW} = (N_{I\_SW} \times IP_{RATIO} + N_{P\_SW}) \times \frac{GOP_{TARGET\_SIZE}}{IP_{RATIO} + N_{P\_GOP}}$$

where $N_{I\_SW}$ is the number of intra-coded pictures in the sliding window, $N_{P\_SW}$ is the number of predicted pictures in the sliding window, $GOP_{TARGET\_SIZE}$ is the target size of the group of successive pictures, $IP_{RATIO}$ is the first ratio and $N_{P\_GOP}$ is the number of predicted pictures in the group of successive pictures;
determine a first ratio ($IP_{RATIO}$) based on previously encoded picture frames of a video sequence comprising one or more intra-coded pictures (I) and one or more predicted pictures (P), the first ratio ($IP_{RATIO}$) being calculated as the ratio between the size of one or more previously encoded intra-coded pictures and the size of one or more previously encoded predicted pictures; and
determine a quantization parameter (QP) to be applied to a frame to be encoded based on the first ratio ($IP_{RATIO}$) and a comparison of the size of the sliding window with the target size of the sliding window; and
an encoder configured to encode the frame to be encoded using the determined quantization parameter.

10. The video system of claim 9, wherein:
the sliding window further comprises one or more bi-predicted pictures (B); and
the rate control circuit is further configured to determine the target size ($T_{SW}$) of the sliding window based on a second ratio ($PB_{RATIO}$) representing the ratio between the size of one or more of said predicted pictures and the size of one or more of said bi-predicted pictures.

11. The video system of claim 9, wherein the rate control circuit is further configured to determine the first ratio ($IP_{RATIO}$) based on a previous value of the first ratio (PREVIOUS_$IP_{RATIO}$) and on a latest ratio between the encoded size of the latest of the intra-coded pictures to be encoded and the latest of the predicted pictures to be encoded.

\* \* \* \* \*